No. 644,340. Patented Feb. 27, 1900.
S. L. TERRY.
AIR METER.
(Application filed Oct. 12, 1898.)
(No Model.)
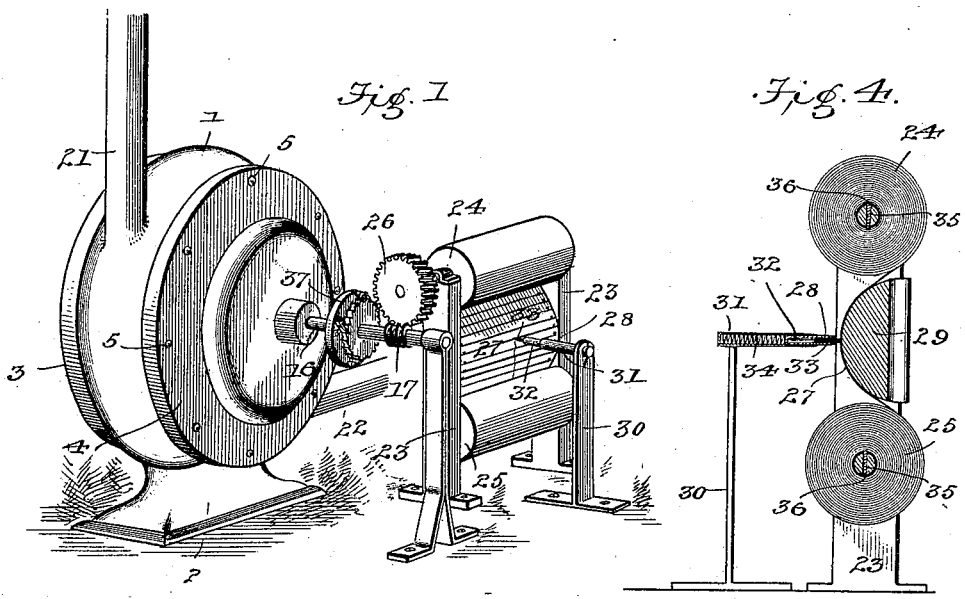
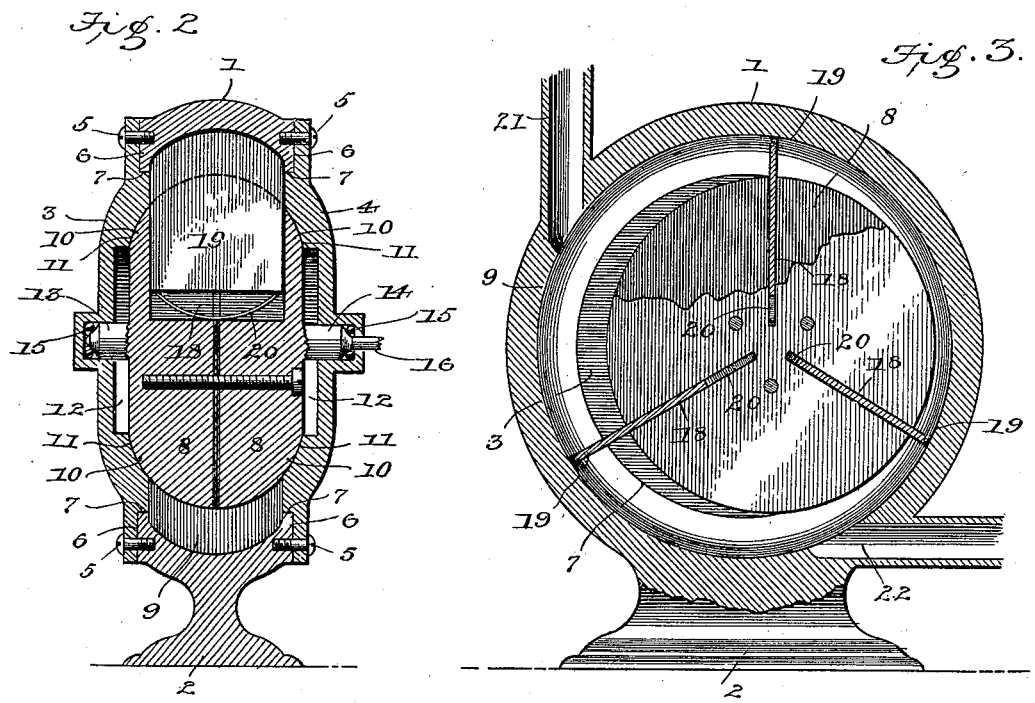
Witnesses
Samuel L. Terry, Inventor
By his Attorneys,

UNITED STATES PATENT OFFICE.

SAMUEL L. TERRY, OF CHICAGO, ILLINOIS, ASSIGNOR OF ONE-HALF TO WILLIAM STRETTON, OF PHILLIPSBURG, KANSAS.

AIR-METER.

SPECIFICATION forming part of Letters Patent No. 644,340, dated February 27, 1900.

Application filed October 12, 1898. Serial No. 693,318. (No model.)

*To all whom it may concern:*

Be it known that I, SAMUEL L. TERRY, a citizen of the United States, residing at Chicago, in the county of Cook and State of Illinois, have invented a new and useful Air-Meter, of which the following is a specification.

My invention relates to fluid-meters, and particularly to an air-meter designed and adapted for use in connection with air-supply pipes or mains, such as those used for conveying fluid-pressure for the operation of drilling-tools and other machinery, and also designed and adapted for use in connection with the train-pipe of a fluid-pressure brake mechanism, the function of the meter being to indicate the quantity of the fluid agent which has passed operatively or in the direction of service through the conductor.

Further objects and advantages of this invention will appear in the following description, and the novel features thereof will be particularly pointed out in the appended claim.

In the drawings, Figure 1 is a perspective view of a fluid-meter constructed in accordance with my invention. Fig. 2 is a vertical central section of the same, taken in a plane parallel with the axis of the fan-core. Fig. 3 is a vertical central section taken in a plane at right angles to that of Fig. 2.

Similar numerals of reference indicate corresponding parts in all the figures of the drawings.

The meter embodying my invention consists, essentially, of a rotary measuring wheel or fan in connection with a registering device of a class wherein the recording medium is detachable from the inscribing mechanism, whereby when the device is used in connection with railway-brake systems a permanent record of the amount of fluid-pressure used in the application of the brakes during a trip may be preserved, and also whereby, in connection with the use of fluid-pressure in operating machinery, the separate recording strip or sheet may be sent to the distributing-office for a similar purpose.

It is obvious that in providing a measuring device for a fluid, such as air, it is necessary to employ means for preventing leakage of even a small percentage of the pressure, and hence in the construction of the measuring device forming one element of my invention I have found it desirable to employ a casing consisting of a wall 1, suitably supported by means of a base 2 and detachable heads 3 and 4, which may be secured by means of screws or bolts 5 to the said wall 1, a rabbeted interlocking joint being formed at the points of contact of said heads with the wall. In the construction illustrated the heads are cut away or rabbeted to form annular seats 6, terminating at their inner sides in abrupt shoulders 7, said seats being adapted to receive the opposite edges of the wall 1, whereby the inner surfaces of the heads adjacent to and extending inwardly from said shoulders 7 are flush with the side portions of the interior surface of the wall 1. In the casing thus formed is mounted the revoluble core 8 of the measuring wheel or fan, said core having a cross-sectionally-convexed peripheral surface, and the interior surface of the wall 1 being cross-sectionally concaved at a curvature corresponding with that of the periphery of the core; but the core extends laterally beyond the inner surfaces of the heads of the casing or beyond those portions of the inner surfaces of said heads which bound the fluid-chamber 9 at its sides, and these enlargements 10 are peripherally beveled or rounded, as shown clearly in Fig. 2, to fit in correspondingly-surfaced cavities 11 formed in the surfaces of the heads. In other words, the lateral enlargements of the core project into the cavities or recesses of the casing-heads, and thus form an efficient break-joint, by which the lateral escape of fluid-pressure introduced into the chamber 9 is effectually prevented. The heads are further recessed, as shown at 12, and are provided eccentrically of the casing with core-spindle bearings 13 and 14, which may be provided with antifriction balls or rollers 15, one end of the spindle being extended, as shown at 16, to carry a worm 17 or other means whereby motion may be communicated to a registering device.

In practice I prefer to employ a wheel or fan core of sectional construction halved upon a line intersecting the spindle at right angles and midway between the side surfaces of the core, the spindle consisting of coaxial trunnions formed integral, respectively, with the core-sections to facilitate the mounting of the core in the casing; but it is obvious that this feature of the construction is susceptible of modification.

The core 8 is radially slitted to form wing-seats 18, in which are mounted for radial reciprocation the wings 19, consisting in the construction illustrated of flat plates adapted for permanent terminal contact with the inner surface of the casing-wall 1. These contacting terminals of the wings are convexed to snugly fit the inner surface of the wall of the casing, and suitable packing-strips or analogous devices may be employed in connection with the side surfaces thereof to prevent the escape or leakage of fluid-pressure and particularly the passage of the fluid from one portion of the fluid-chamber 9 to another, said portions of the fluid-chamber being separated by the interposition of the wings. The wings are held in permanent terminal contact with the surface of the casing-wall by means of springs 20, arranged in the inner ends of the wing-seats, whereby the wings are held extended by means of a yielding force exerted continuously.

The casing is provided with an inlet-port 21 and an outlet-port 22, communicating with the fluid-chamber 9 at intervals and having tubular extensions with which may be connected adjacent sections of a fluid-pressure conductor, such as the train-pipe of a fluid-pressure brake mechanism, and it is obvious that during the application of the brakes or the use of the fluid-pressure in the tapped conductor for the operation of machinery the wheel or fan of the measuring device will receive a rotary motion, and by so proportioning the parts that the fluid-chamber 9, between two adjacent wings 19, will contain a certain volume of fluid at a given pressure it is obvious that the amount of fluid passing through the measure may be ascertained by recording the number of revolutions of the wheel or fan.

I am aware of the fact that fluid-meters are not broadly new and that fluid-meters have been constructed with rotary members constructed and connected to operate registering devices; but it is an important object of my invention to provide an apparatus of this class wherein the recording medium is separate from the other elements of the apparatus to provide for its detachment and permanent preservation. Hence in the construction illustrated I employ a registering device having a supporting-frame, including standards or uprights 23 or their equivalents, provided with bearings for the spindles of drums or spools 24 and 25, the spool 24 being known as the "receiving-spool" and the spool 25 as the "supply-spool." The receiving-spool spindle is provided with a worm-gear 26, meshing with the worm 17 and adapted to receive rotary motion at an angular speed proportionate to that of the spindle of the fan, whereby the length of a line indicated upon the surface of a web 27 by means of an inscribing medium 28 will disclose the amount of fluid-pressure which has passed through the measure. Any suitable arrangement of lines and graduations may be provided upon the surface of the recording medium, and as said recording medium is detachably secured at its extremities, respectfully, to the supply and receiving drums or spools it is obvious that the same may be removed and preserved as a permanent record of the expenditure of fluid-pressure. At an intermediate point between the supply and receiving drums or spools the recording medium traverses a platen or inscribing-plate 29, also supported by said standards and preferably having a convexed operative surface. The inscribing medium illustrated in the drawings consists of a supporting-upright 30, carrying a tubular sleeve or guide 31, a pencil-holder 32, mounted for reciprocatory movement in said guide, a pencil or other inscribing-point 33, secured in said holder, and an advancing-spring 34, arranged in the guide in rear of the holder to maintain the inscribing-point in permanent yielding contact with the surface of the recording medium.

The apparatus above described constitutes a simple and inexpensive mechanism adapted to measure accurately the fluid-pressure passing through a conductor for either of the purposes above indicated, the recording medium being detachable when its work is completed to give place for a fresh sheet or web, which may be of paper, vellum, or other analogous flexible material. Also, to facilitate the attachment of the extremities of the web to the drums or spools, the latter may be longitudinally slotted, as shown at 35, the extremities of the web being secured in the slots by means of wedges or filling blocks or strips 36.

When designed for use in connection with air-brake systems, it is preferable to employ a sectional shaft for the rotary member of the measuring device and connect the sections by means of a ratchet mechanism, (indicated at 37,) this ratchet mechanism being of advantage in connection with the apparatus when there is any tendency at intervals to back pressure in the conductor with which the apparatus is connected and when it is desired to register only the forward pressure or the pressure in one direction of the fluid conveyed by the conductor. It will be understood, furthermore, that various changes in the form, proportion, and the minor details of construction may be resorted to without departing from the spirit or sacrificing any of the advantages of this invention.

Having described my invention, what I claim is—

A fluid-meter consisting of a casing, of which the wall is interiorly concaved and the heads provided with bevel-faced pivots in the form of concavities projected into the body of the casing by thickening the walls at their location, a core eccentrically mounted in the casing and having a cross-sectional convexed peripheral surface extending laterally beyond the inner surfaces of the bevel-faced pivots or beyond those portions of the inner surface of the casing which bound the fluid-chamber to form an effectual break-joint, the said core being provided eccentrically to the casing with core-spindles and having wing-seats radially extending outwardly therefrom, wings movably mounted in said seats, one of the core-spindles being extended in reduced form, a ratchet mechanism on said reduced extended portion of one of the spindles, a worm on the spindle outside of the ratchet mechanism, and recording mechanism actuated by the said worm.

In testimony that I claim the foregoing as my own I have hereto affixed my signature in the presence of two witnesses.

SAMUEL L. TERRY.

Witnesses:
JOHN H. SIGGERS,
A. C. SINGLETON.